Figure 1:
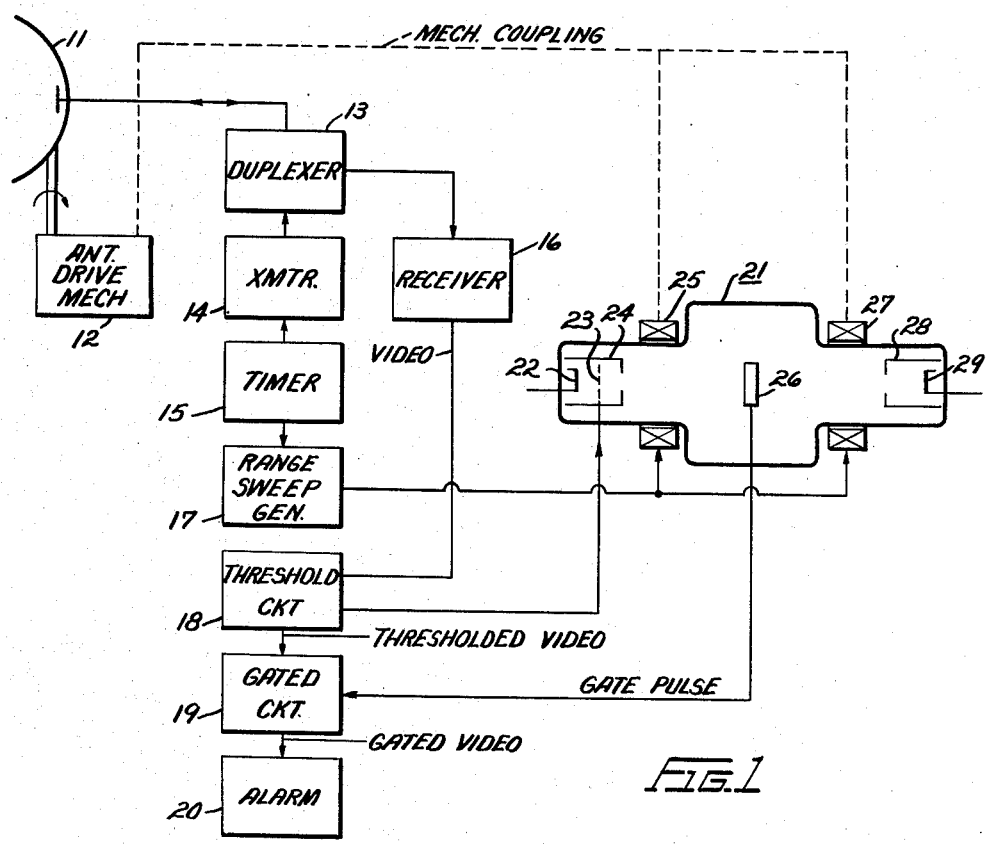

June 28, 1960  F. D. COVELY 3RD  2,943,316
SELECTIVE DETECTION OF RADAR TARGETS IN
THE PRESENCE OF NOISE SIGNALS
Filed Jan. 7, 1955  5 Sheets-Sheet 1

INVENTOR.
FRANK D. COVELY, 3RD.
BY
ATTORNEY

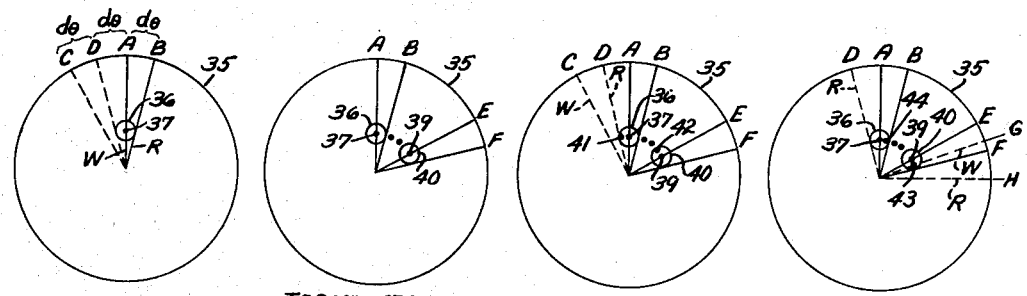
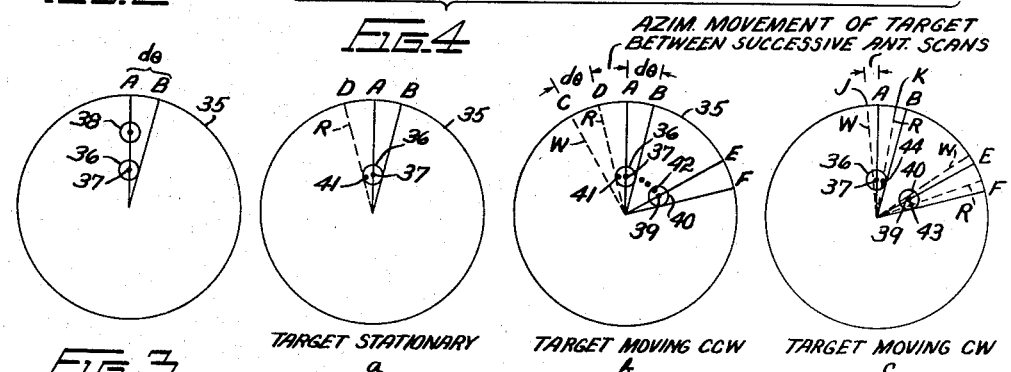
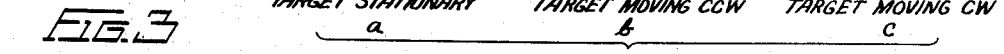
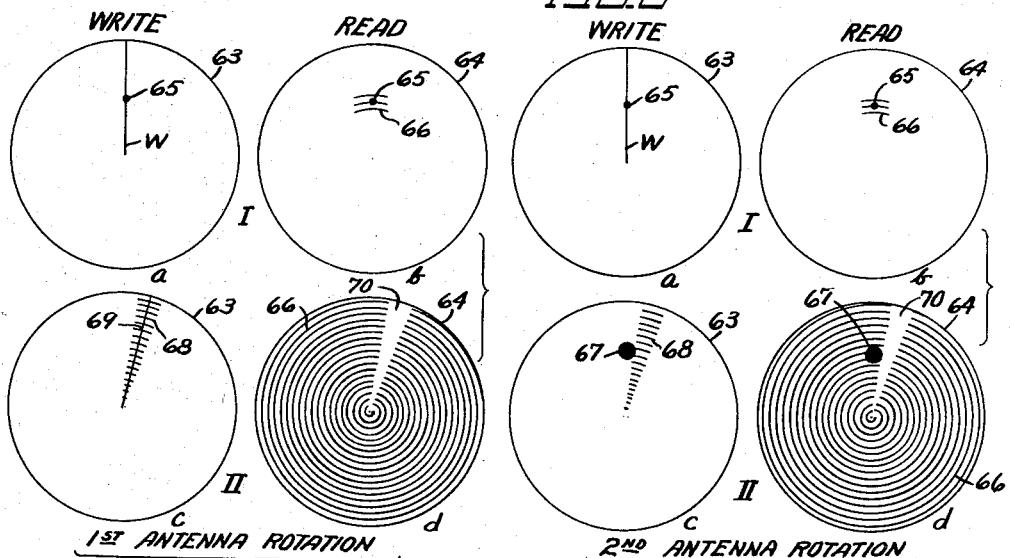

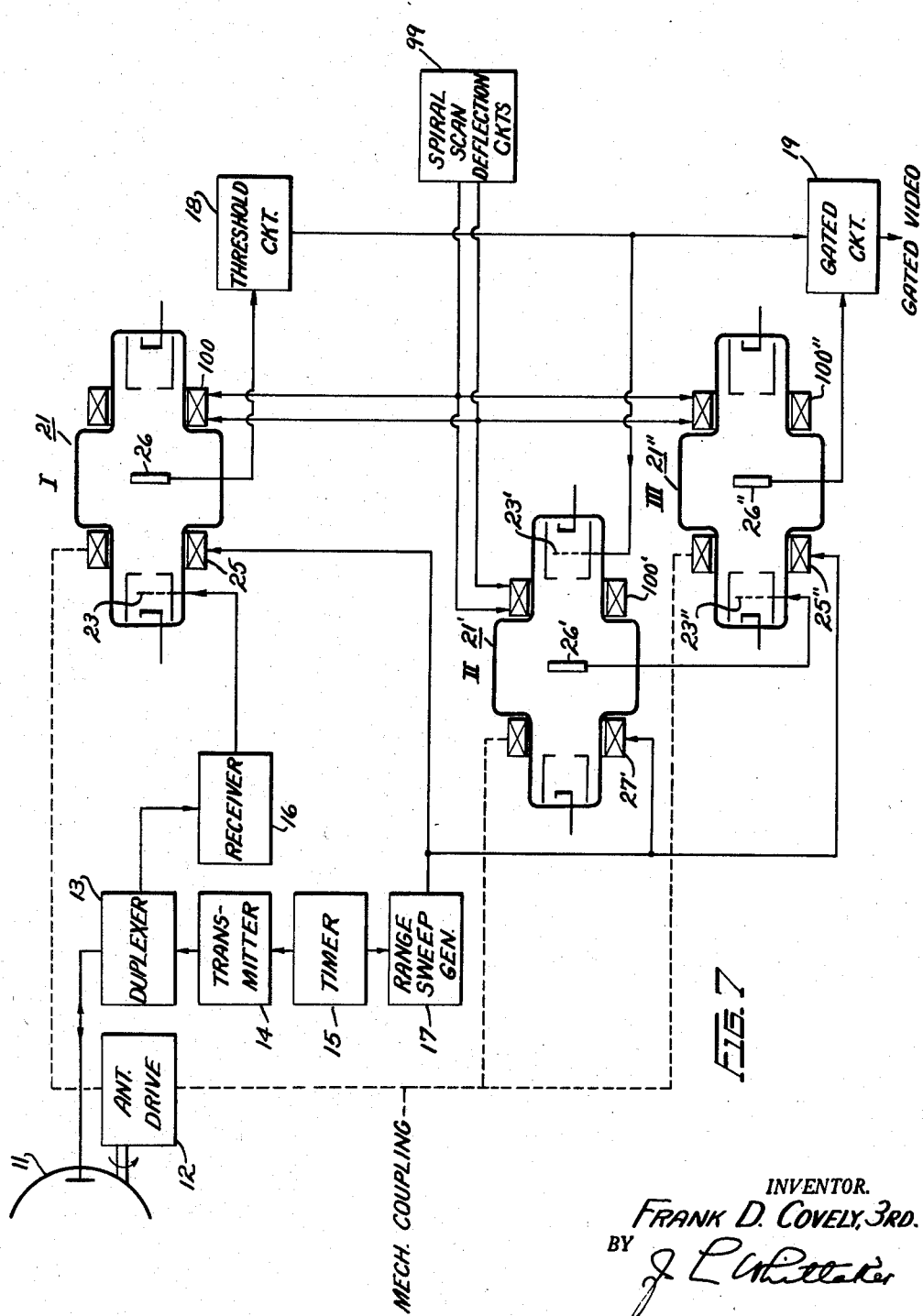

June 28, 1960  F. D. COVELY 3RD  2,943,316
SELECTIVE DETECTION OF RADAR TARGETS IN
THE PRESENCE OF NOISE SIGNALS
Filed Jan. 7, 1955  5 Sheets-Sheet 4
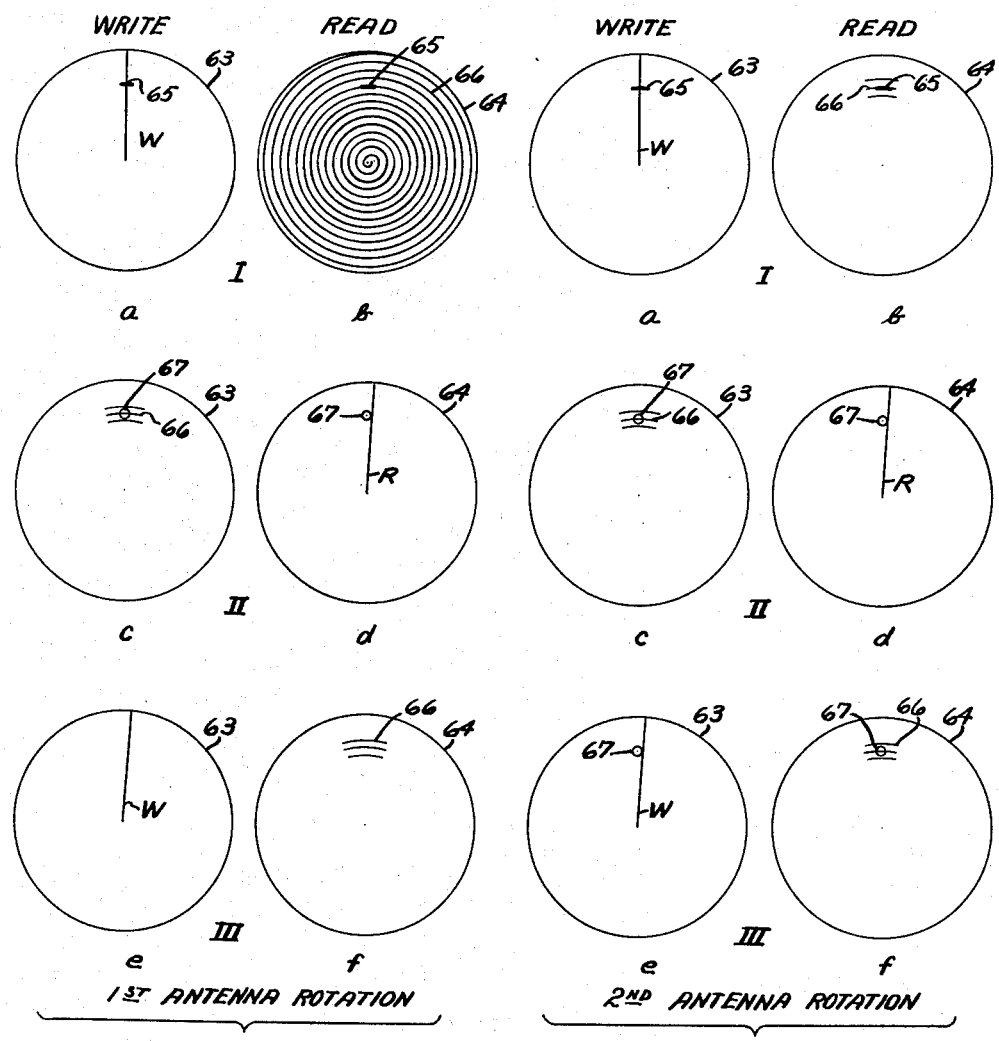
INVENTOR.
FRANK D. COVELY, 3RD.
BY
ATTORNEY

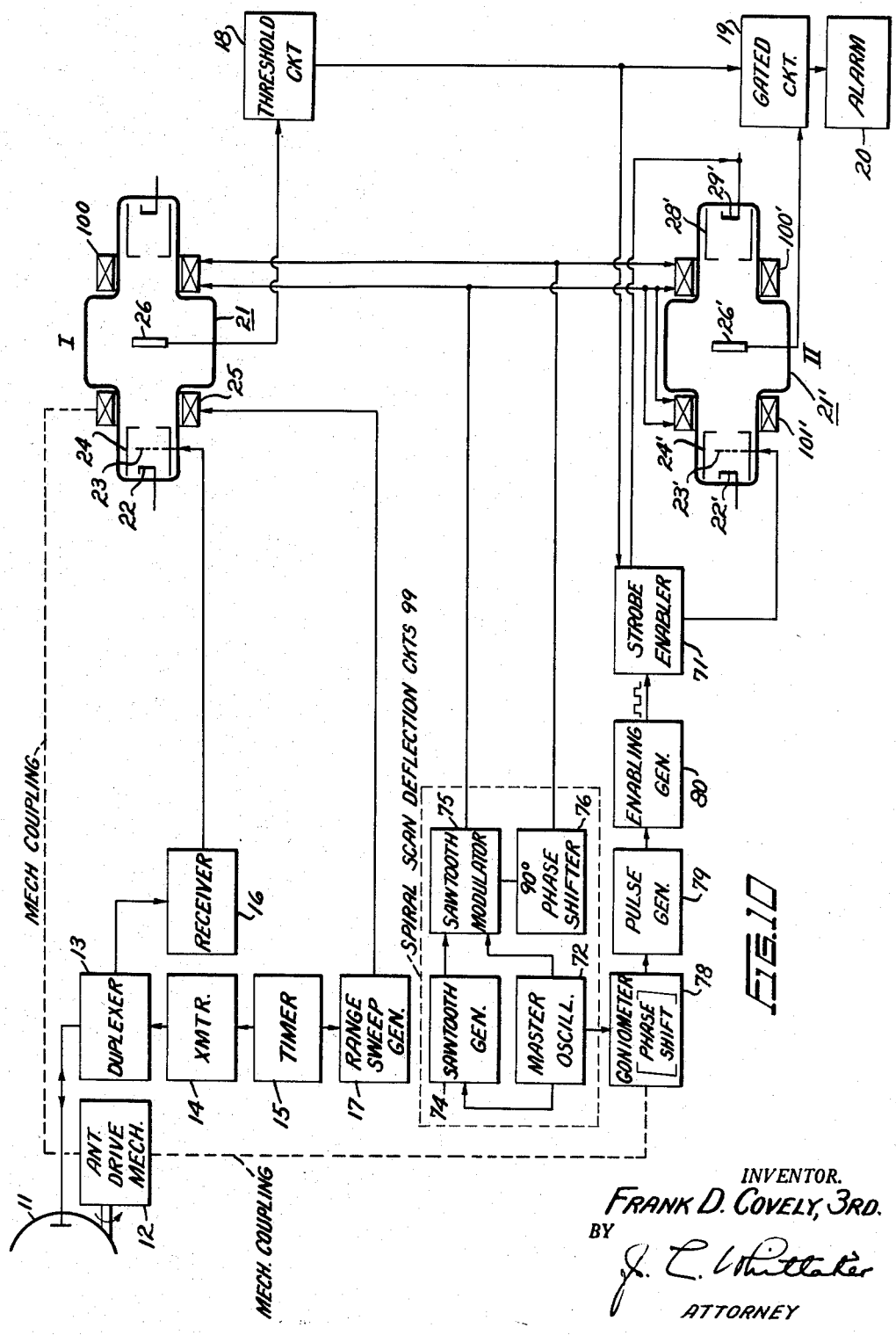

United States Patent Office 2,943,316
Patented June 28, 1960

2,943,316
SELECTIVE DETECTION OF RADAR TARGETS IN THE PRESENCE OF NOISE SIGNALS

Frank D. Covely 3rd, Haddonfield, N.J., assignor to Radio Corporation of America, a corporation of Delaware Filed Jan. 7, 1955, Ser. No. 480,580

25 Claims. (Cl. 343—17.1)

This invention relates to improved systems for distinguishing repetitive signals from non-repetitive signals and, more particularly, to an improved system and method for increasing the probability of distinguishing radar target echoes from noise impulses.

The video and intermediate frequency stages of a radar receiver inherently produce noise signals. Radar echo pulses passing through these stages are mixed with the noise signals, thereby providing a composite signal. The detection circuits are then presented with the difficulty of separating the echo pulses from the noise impulses, the latter being undesirable because they may partially or completely obscure the echo signals and produce false target indications.

This difficulty becomes serious when the received echo pulses are weak, as may be the case with targets located at the extreme range of the radar system. Even after amplification in the video and intermediate frequency stages of the radar receiver, the amplitudes of the echo pulses may still be comparable to the amplitudes of the noise impulses.

The detection, or threshold, level of the radar receiver is usually set at an amplitude that eliminates most of the noise impulses and allows only a few noise impulses of very high amplitude to be detected. If the threshold level is set high enough to eliminate all noise impulses, the target detection probability is decreased, since targets whose echo amplitudes are no higher than the noise amplitudes will also be eliminated. On the other hand, although decreasing the threshold level will produce the desired effect of increasing the target detection probability, the amount of interfering noise which is permitted to pass to the detection circuits is increased. The problem thus becomes one of increasing the target detection probability without simultaneously increasing the detection of noise signals.

A general object of the present invention is to provide an improved method and circuit for distinguishing repetitive signals from non-repetitive impulses, some of smaller and some of greater amplitude than said signals.

Another object of this invention is to provide an improved method and system for the automatic detection of radar echoes.

A further object of this invention is to provide an improved method and system for minimizing the necessity for constant surveillance of a radar screen.

Another object of this invention is to increase the true target detection probability of radar systems relative to the false target detection probability.

Still another object of this invention is to provide an improved method and system which permits the threshold level for the effective detection of radar echoes to be lowered well into the noise level.

A further object is to provide an improved method and system for increasing the effective detection range of radar systems.

The foregoing objects and advantages of the present invention are accomplished in a typical embodiment thereof by taking advantage of the non-repetitive nature of noise impulses and the repetitive nature of target echoes. Any target signal indication which repeats in the same small area on a plan-position-indicator (P.P.I.)-type target plot on two successive radar antenna rotations is considered a target echo and is coupled to some type of indicating circuit.

The above is accomplished by causing an echo signal received during one rotation of the radar antenna to produce a gate pulse during the succeeding rotation at the time at which the echo pulse should reappear. If the echo does reappear at the proper time during succeeding antenna rotations, it is applied through the gate to the indicator. If it does not reappear, no signal is applied to the indicator.

If the indication is a noise impulse, the probability of its appearance in the same small target area on two successive rotations is very slight. Therefore, although gating pulses are generated on the second rotation, no impulse is present to pass through the gate and activate the target indication or alarm systems.

Since false target detection depends on a false target impulse being in the same area on two successive beam rotations, the false target detection probability is very low and the detection threshold may be placed within the noise level.

In the preferred embodiment, the generation of gating pulses is accomplished by means of a storage tube which is scanned by its writing and reading beams in P.P.I. (plan-position-indicator) fashion. By defocusing the writing beam, echo signals are caused to produce charged areas, rather than points, on the target plate.

The reading beam precedes the writing beam by an angle ($d\theta$) sufficient to position the reading beam just beyond the limits of any charged area laid down by the writing beam on its first rotation. On the second rotation, the reading beam traverses the charged area, thereby generating a series of pulses which are employed as gates.

If the echo which produced the charged area is a true target, it will be repeated on this second rotation and will be written somewhere within the limits of the previously charged area since the radius of the charged area is selected to be greater than the corresponding distance any target, such as a fast moving aircraft, can travel in one antenna rotational period. The gating pulses are then employed to allow the succeeding echo to pass through a gate circuit and activate an indicating circuit, which may be an alarm.

Figure 6:
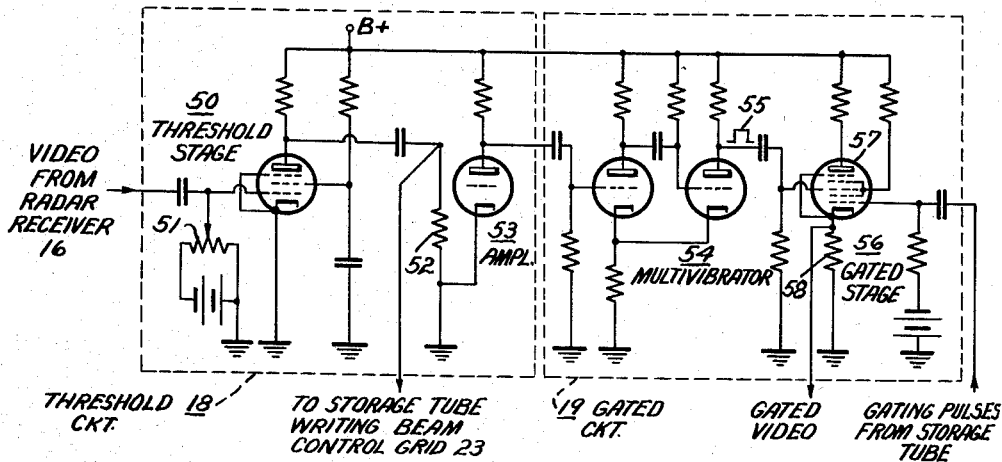

The invention will be described in greater detail with reference to the accompanying drawings in which similar reference characters relate to similar elements, and in which:

Figure 1 is a block circuit diagram of a preferred embodiment of this invention, Figure 2 is a single-hit diagram of the charged area formed by a stationary echo on the target plate of the storage tube showing the positions of the reading and writing strobes at different times, Figure 3 is a diagram indicating how the angle $d\theta$ is determined, Figures 4a–4c are a series of multiple-hit diagrams showing hits and charged areas in relation to the positions of the storage tube reading and writing strobes at different times, Figures 5a–5c are a series of diagrams illustrating hits and charged areas in relation to the positions of the storage tube reading and writing strobes when slippage exists between the radar antenna and the storage tube strobe lines, Figure 6 is a schematic circuit diagram of typical embodiments of the threshold and gated circuits of the preferred embodiment of the invention illustrated in block form in Figure 1, Figure 7 is a block circuit diagram of a second embodiment of the invention, and Figures 8a–8f and Figures 9a–9f a series of diagrams helpful in understanding its operation, Figure 10 is a block circuit diagram of a third embodiment of the invention, and Figures 11a–11d and Figures 12a–12d are a series of diagrams helpful in understanding its operation.

At this point, some terms to be used hereinafter will be defined:

"Strobe line" or "strobe"—a single traversal of either the reading or writing beam from the center to the periphery of the raster of a P.P.I.-type scan.

Hit—the echo pulse received by a radar from the reflection by a target of a single radiated pulse. Only one hit may occur per target for each strobe line.

Referring to Figure 1, a timer 15, which may be a bocking oscillator or other pulse-generating circuit, delivers trigger pulses to the transmitting circuits 14 which generate high-power pulses of high-frequency electromagnetic energy. These pulses are applied through a duplexer 13, which may be a gas-filled, transmit-receive switch, to the antenna 11, which radiates the energy into space. The antenna is rotated azimuthally by means of the antenna drive mechanism 12, which may be a motor.

If a radiated pulse strikes a target, such as an aircraft, it may be reflected back to the antenna 11 and applied to the duplexer 13, whence it is applied to the receiver 16, where it is amplified and detected. Video signals from the amplifying and detecting circuits of the receiver 16 of the radar are impressed upon a threshold circuit 18 which will be described in more detail below. The bias voltage of the threshold circuit 18 is adjusted at a level below that of the peaks of the noise impulses, so that only impulses and video signals above this level will be passed (this is known as "thresholding"). The output of the threshold circuit 18 is applied to a gated circuit 19 and also to the writing gun of a storage tube 21, such as a Graphechon, having independent writing and reading guns.

Figure 1 shows schematically the essential components of a Graphechon, omitting details such as supply voltages. More detailed information on the Graphechon's structure and operation may be obtained on page 51 of "Storage Tubes" by Kazan and Knoll, published by John Wiley and Sons, New York.

The writing gun of the Graphechon 21 comprises a cathode 22, a control grid 23 and an accelerating anode 24. The writing beam may be deflected electromagnetically by a deflection coil 25 which is mechanically coupled to the antenna drive mechanism 12.

The reading gun of the Graphechon 21 comprises a cathode 29 and an accelerating anode 28. The reading beam may be deflected by the reading beam deflection coil 27 which is also mechanically coupled to the antenna drive mechanism 12.

The output of the reading beam is derived from the target plate 26 of the Graphechon 21 when the reading beam traverses a charged area. This output is applied as a gating pulse to the gated circuit 19, which may be a normally non-conducting amplifier. The output of the gated circuit 19 obtained when an echo pulse is applied thereto at a time when the gated circuit 19 is rendered conductive by a gating pulse, may be applied to an alarm circuit 20, and/or to other circuits, such as a store circuit or radar display circuit.

The storage tube beam deflection voltages are sawtooth voltages which sweep the writing and reading beams from the center to the periphery of a plan-position-indicator (P.P.I.) type scanning raster 35 (see Figure 2) in time synchronism with each radiated radar pulse. The sawtooth voltages are derived from the range sweep generator 17, a new sawtooth being produced each time a timing pulse is applied to the range sweep generator 17 from the timer 15.

The P.P.I.-type raster 35 (Figures 2 and 3) is produced by rotating the writing and reading beam deflection coils, 25 and 27 respectively, the reading beam preceding the writing beam by a small angle $d\theta$. Since both coils are mechanically rotated by the same rotational means, the reading beam can be made to constantly precede the writing beam by an initial angular displacement of the reading beam deflection yoke 27 with respect to the writing beam deflection yoke 25. The angle $d\theta$ between the reading and writing electron beam is made equal to the angle between a strobe line cutting through the center of the charged area 36 (see Figure 2) and a strobe line tangent to the edge of the charged area 36. As previously explained, the defocused writing beam records a hit as a charged area rather than a point. In determining the angle $d\theta$, an echo 37 which occurs about one-half the distance from the center to the periphery of the raster 35 should be chosen. A strobe line tangent to a charged area located at such a point will be quite close to the limits of a charged area 38 resulting from an echo located near the periphery of the raster 35 (see Figure 3), and, in the automatic detection of radar targets, it is more important to detect the most distant targets rather than those half-way to the radar, or closer, since the nearby targets are usually obvious. It is desirable to keep the reading strobe line (R) as close to the limit of the charged area 36 as possible so that hits upon a target will not be lost, as will be seen subsequently.

Referring to Figure 2, the positions A and B of the writing (W) and reading (R) strobes on a P.P.I.-type raster 35 are illustrated in expanded form. It is to be understood, of course, that Figure 2 actually illustrates two rasters, the writing and reading beam rasters which are located on opposite sides of the target plate 26 of the storage tube 21. In the drawings, the direction of rotation of the reading and writing strobes and the radar antenna is clockwise with respect to the reader. The writing (W) and reading (R) strobes are shown in their respective positions with respect to the charged area 36 laid down by the writing beam when a target echo 37 is received, or, in other words, when a hit occurs. Instead of being laid down as a point, the hit 37 is laid down as a small, roughly circular, charged area 36 by defocusing the writing beam. The amount of defocusing is such that even the fastest aircraft cannot quite travel out of the charged area 36 during the period of one radar antenna rotation.

When a reading strobe traverses the charged area 36 of a hit 37, a positive pulse is delivered at its output. As the reading beam progresses from position D to position B on the second rotation, a series of pulses, which shall be called gating pulses, are produced. These gating pulses are employed to activate the gated circuit 19.

If the reading and writing strobes (R) and (W) were to coincide, gate pulses would be generated during the period the strobes advanced from A to B, since the charged area 36 is produced at the instant a hit occurs at position A. The gated circuit 19 would be activated the instant a hit occurred and the echo initiating the gate pulse would be allowed to pass through the gated circuit 19 to the alarm 20. As explained previously, this is an undesirable occurrence. The alarm 20 must receive a signal only when an echo repeats.

The reading strobe (R) is, therefore, advanced by a small angle $d\theta$ which is sufficient to place the reading strobe (R) just beyond the boundary of the charged area 36 resulting from the hit 37. No gating pulses are now generated on the sweep rotation during which the hit 37 first occurs, but on the second rotation, when the reading strobe (R) advances to position D, it encounters the charged area 36 of the hit 37 and gating pulses are produced until the position B is reached.

In the case of a single hit which recurs each time the writing strobe (W) reaches position A, no echo signal will come through the gate circuit 19 because, due to the displacement of the reading strobe (R), the second hit will occur when the reading strobe (R) reaches position B which is beyond the charged area and the writing strobe (W) reaches position A—that is, the second hit occurs when the gating pulses are no longer being generated.

The usual case, however, is not that of a single hit, but that of a series of hits from any single target during a single antenna rotation, due to the beam width of the energy radiated from the radar antenna. Referring to Figure 4a, a series of hits on a stationary target is illustrated. (For the purpose of clarity, wherever a series of hits is illustrated, only the charged areas due to the first and last hits will be shown.) The scale from positions A to F is greatly expanded, for purposes of illustration. On the second antenna rotation, the same series of hits occur. The last hit 39 will be lost (i.e., will not pass through the gated circuit 19 (Figure 1)) since, on the second antenna rotation, the gating pulses cease when the reading strobe (R) reaches position F and the last hit 39 does not occur until the reading strobe has reached position F.

The charged area 36 due to a single hit 37 is sufficiently large that even the speediest target cannot emerge from its boundaries during a single rotation of the radar antenna. If the speediest target is moving counter-clockwise (a direction of movement opposite that of the beams) and almost reaches position D (see Figure 4b) on the first hit of the second rotation, gating pulses are initiated when the reading strobe (R) reaches position D because this marks the outer edge of the previously charged area and thus the first hit of the second rotation 41 will pass through the gated circuit 19. The gating pulses will last until the reading strobe (R) clears position F, the opposite limit of the previously charged area, so that the gating period is more than sufficient to include the last hit of the second rotation 42.

If the speediest target moves clockwise and reaches position G (see Figure 4c) (almost at the edge of the previously charged area) on the last hit of the second rotation 43, the gating pulses are initiated when the reading strobe (R) reaches position D, and continue until the reading strobe (R) reaches position F. The first hit on the second rotation 44 passes through the gated circuit 19 but the last hit 43, which occurs at position G, is lost since the reading strobe (R) will then be at position H, past the area charged on the first rotation, and gating pulses are no longer being generated.

The preferred means of preventing the loss of hits is to rotate the reading and writing strobes (R) and (W) through an angle $360°-d\theta$ for each antenna rotation of 360°. This slippage between the reading and writing strokes (R) and (W) and the antenna amounts to $d\theta$ degrees for each complete antenna rotation. Thus, referring to Figure 5a, if the target is stationary, the first hit on the second rotation 41 will occur when the reading strobe (R) reaches position A and the writing strobe (W) is at position D. Since the second echo pulse 41 occurs in time when the reading stroke (R) has reached position A, and since gating pulses commence when the reading strobe (R) reaches position D and cease when it reaches position B, the second echo pulse 41 passes through the gated circuit 19.

If the speediest target moves almost to position D on the second rotation (see Figure 5b), the second echo pulse 41 occurs when the writing strobe (W) is at position C and the reading strobe (R) is at position D, since the target movement cannot quite equal the radius of the previously charged area 36 in one antenna rotation. The reading strobe (R) is, therefore, within the previously charged area 36 and the hit 41 on the second rotation comes through the gated circuit 19. The last hit of the second rotation 42 occurs at position E when the reading strobe (R) is at position F and within the charged area 40 of the last hit of the first rotation 39.

If the speediest target moves clockwise to position K (see Figure 5c) (almost to the edge of the previously charged area 36 of the first hit on the first rotation 37), the first hit on the second rotation 41 occurs when the writing beam (W) is at position J and reading beam (R) is at position K, or well within the previously charged area 36, and the hit comes through the gated circuit. The last hit 42 occurs when the writing strobe (W) has reached position E and the reading strobe (R) has reached position F and, therefore, the reading strobe (R) is still well within the previously charged area 40 of the last hit on the first rotation 39. Thus, slippage prevents the loss of any hits in both the multi-hit and the single-hit situations.

It is to be noted that when slippage is employed there is no correspondence between the angular position of the antenna and the angular positions of the reading and writing strobes. Since operation of this system is based only upon the re-occurrence of a hit at a time when gating pulses are being generated from the charged area of the hit which occurred during the previous antenna rotation, synchronization of the rotation of the strobes with the rotation of the antenna is unnecessary. All that is required is to have the reading strobe (R) within the previously charged area when the succeeding hit occurs and this is accomplished by slippage.

Since the storage tube deflection coils 25 and 27 are driven by the antenna motor, slippage may be accomplished by means of differential gearing, that is, the gear on the shaft which drives the deflection coils is larger than the gear coupled to the antenna by an amount sufficient to cause a slippage angle of $d\theta$. In systems in which the deflection coils are stationary and the deflection sawtooth voltages are derived from sine and cosine rheostats or synchros coupled to the antenna motor, differential gearing between the antenna motor and the moving parts of the rheostats or synchros may be utilized.

Figure 6 is a schematic circuit diagram of the gate and threshold circuits of Figure 1. The video output of the radar receiver 16 is coupled to threshold stage 50, the bias voltage level of which can be adjusted by means of a potentiometer 51. The output of the threshold stage 50 is coupled to the grid of an amplifying stage 53 and to the writing gun control grid 23 of the storage tube 21.

The output of the amplifying stage 53 is coupled to a multivibrator 54 which produces a positive rectangular pulse 55 when triggered by a video pulse from the amplifying stage 53. By utilizing the output pulses of a multivibrator in place of the video pulses themselves, identical, constant-amplitude video output pulses can be obtained regardless of the amplitude and characteristics of the received echoes.

The output of multivibrator 54 is coupled to the third grid of a gate stage 56, which comprises a normally non-conducting pentagrid mixer tube 57. The gating pulses from the target plate 26 of the storage tube 21, which are fed to the first grid of the gate stage 56, cause the latter to conduct and if a multivibrator pulse is coupled to the gate stage 56 during its conducting period, a positive pulse having the same shape as the multivibrator pulse appears across the cathode resistor 58 of the gate stage 56. This positive pulse is applied to an alarm device 20 (Figure 1) such as a bell or buzzer or an indicating means such as a lamp or cathode ray tube.

A second embodiment of the invention is shown in Figure 7. The output of the radar receiver 16 is applied to the writing-gun control grid 23 of a first storage tube 21. The writing beam is deflected in plan-position-indicator (P.P.I.) fashion, as explained previously in connection with the storage tube illustrated in Figure 1.

The output of the first storage tube 21, which is read out by means of a spiral scan, is applied to a threshold circuit 18, similar to the one employed in Figure 1. The thresholded output of the storage tube 21 is written by means of a spiral scan on the target plate 26' of a second storage tube 21'. The reading beam of the second storage tube 21' scans the target plate 26' in P.P.I.-fashion and the output of the second storage tube 21' is written on the target plate 26" of a third storage tube 21" in P.P.I.-fashion. The reading beam of the third storage tube 21" scans its target plate 26" with a spiral scan and the output of the third storage tube 21" is applied to the gated circuit 19, as is also the output of the threshold circuit 18.

As indicated in Figure 8b, the echo 65 is read out by means of a spiral scan 66 (Figure 8b) (spiral scans are symbolically indicated in subsequent figures by three or more concentric arcs). The advantage of spiral scan derives from the fact that the electron beam scans in the direction of the long dimension of a multiple-hit echo. As compared with P.P.I. or television-type scans where the duration of output from each multiple-hit echo is comparable to the duration of output from a random noise impulse, spiral scan affords an echo output of greater duration than that of a random noise impulse. This results in an improvement in the signal-to-noise ratio when the beam output is applied to an amplifier of limited bandwidth, due to the longer period of time during which the echo signals are impressed upon, and are able to charge, the input and output resistor-capacitor networks of the amplifier.

Generation of the spiral scan is accomplished by applying the outputs from the spiral scan deflection circuits 99, shown as a single block in Figure 7, to a pair of stationary, orthogonal, reading gun deflection coils 100. (A more detailed block circuit diagram of the spiral scan deflection circuits 99 is shown in Figure 10. Details of the spiral scan circuits will be discussed later in connection with Figure 10.)

The operation of the embodiment shown in Figure 7 is best understood by reference to Figures 8 and 9. On the first rotation of the antenna 11, a target echo 65 (Figure 8a) is laid down by the writing strobe (W) as a small arc (indicating a series of hits). The hit 65 is read out by means of a spiral scan 66 (Figure 8b) and impressed through the threshold circuit 18 upon the control grid 23' of the writing gun of the second storage tube 21'. The writing beam of the second storage tube 21' is scanned spirally and is defocused so that a video echo will appear as a charged area rather than a point. The hits 65 are thus laid down as a charged area 67 (Figure 8c) the size of which is sufficiently large that the target cannot reach its boundaries within the period of a single rotation of the radar antenna 11.

The reading strobe (R) of the second storage tube 21' (Figure 8d) and the writing strobe (W) of the third storage tube 21" (Figure 8e) sweep in synchronism with each other and lead the writing strobe (W) of the first storage tube 21 by the angle $d\theta$, the size of which is determined here as it is in the preferred embodiment illustrated in Figure 1. The reason that P.P.I.-scans are utilized in the second and third storage tubes 21' and 21" is to provide a means for obtaining the displacement angle $d\theta$, whereby the generation of gating pulses simultaneously with the writing of the first hit on the first antenna rotation may be avoided. Thus, on the first antenna rotation, the reading strobe (R) does not traverse the charged area 67 (Figure 8d), no charge is written on the third storage tube 21" (Figure 8e) and no gating pulses are read out of the third storage tube 21" (Figure 8f). When a charge is written on the target plate 26" of the third storage tube 21", it is read out by means of a spiral scan (Figure 8f) and applied to the gated circuit 19.

The storage characteristic of the storage tubes herein utilized is such that a charged area on the target plate will remain charged for the length of time it takes to complete one antenna rotation. (The Graphechon can be designed to provide approximately this type of storage characteristic.) Thus, the spiral reading beam of the first storage tube 21 reads out the echo 65 each time the beam traverses it and the echo 65 is laid down as a charged area on the second storage tube 21'. However, gating pulses are not generated during the course of the first antenna rotation since the reading beam (R) of the second storage tube 21" leads the antenna (and the writing beam (W) of the first storage tube 21) by the angle $d\theta$.

On the second rotation (Figure 9), the reading strobe (R) of the second storage tube 21' traverses the charged area 67 (Figure 9c). Pulses are read out (Figure 9d) and applied to the writing gun of the third storage tube 21" (Figure 9e). A charged area 67 is thus produced on the target plate 26" of the third storage tube 21" (Figure 9f) thereby permitting gating pulses to be produced by the spiral scanning of its reading beam. This output is a series of gating pulses, each produced whenever the reading beam 66 traverses the charged area 67. These gating pulses are produced during the entire second rotational period of the antenna 11 due to the persistence of the charge of the target plates of the storage tubes as heretofore explained.

Thus, if a hit 65 (Figure 9a) is recorded during the second antenna rotation in the same location (substantially) as the previous echo, it will be transmitted through the gated circuit 19 to the alarm 20 (Figure 1).

It is to be noted that the P.P.I.-type scans are not synchronized with the spiral scans in any way and that the number of spiral scans per P.P.I.-scan may be of the order of 100 to 1.

Figure 10 shows a third embodiment of the invention. The output of the radar receiver 16 is coupled to the writing gun of a first storage tube 21, such as a Graphechon, where it is stored by scanning the target plate 26 in P.P.I.-fashion. To take advantage of the improved signal-to-noise ratio furnished by a spiral scan as compared with a P.P.I.-scan, the stored information is read out by a spiral scan and applied to a threshold circuit 18.

The output of the threshold circuit 18 is impressed through the strobe enabler 71, a normally non-conducting amplifier caused to conduct by gating pulses from the enabling generator 81 (as is explained later), upon the control grid 21' of the writing gun of a second storage tube 21'. Here the threshold circuit output is stored by means of a spiral scan synchronized with the spiral scan of the reading beam of the first storage tube 21, so that echoes will be located in the same relative positions on both target plates 26 and 26'. The output of the reading beam of the second storage tube 21' is coupled to a gated circuit 19 to which is also coupled the video output of the threshold circuit 18 (Figure 10).

The formation of the charged areas and generation of the gating pulses is illustrated by the group of rasters 63 included in Figures 11 and 12. On the first rotation of the antenna, with which the writing strobe (W) of the first storage tube 21 is in synchronism, an echo 65 is recorded (Figure 11a). The echo 65 is immediately read out by the spiral reading scan 66 (Figure 11b). Since the spiral scans of the reading beam of the first storage tube 21 and the writing beam of the second storage tube 21' are in synchronism, the echo would immediately be written on the second storage tube 21' and gating pulses woud be generated by the scanning of its reading beam. This would permit the hit on the first antenna rotation to be passed through the gated circuit 19 to the alarm 20. To prevent this, only a small, wedge-shaped sector 68 (Figure 11c) of the spiral scan is enabled (allowed to lay down a charge). The wedge-shaped sector 68 of the spiral scan corresponds roughly to a strobe line on a P.P.I.-scan. The imaginary central axis 69 of this wedge-shaped area 68 sweeps around the raster in synchronism with the writing strobe (W) of the first storage tube 21, but the wedge-shaped area 68 leads the writing strobe (W) by the angle $d\theta$. The writing beam of the second storage tube 21' is defocused so that a video echo 65 (Figure 12a) will appear as a charged area 67 (Figure 12c) rather than a point. Thus, an area is generated in which the echo, if it repeats, will fall on the next radar antenna rotation. As the wedge-shaped area 68 sweeps around on the second antenna rotation (Figure 12c) it lays down the charged area 67 because echo signals are being applied to the writing gun of the second storage tube 21' from the target plate 26 of the first storage tube 21. (Echoes continue to be read out of the charged area of the first hit during the entire period of the first antenna rotation due to the storage characteristic of the first storage tube 21. The storage characteristic for this read-out period is ideally rectangular in shape, the duration of the rectangle being equal to the period of one antenna rotation. The storage characteristic of a Graphechon can be adjusted to provide approximately this type of characteristic.) A series of gating pulses are generated as the reading beam traverses the charged area 67 during the course of its spiral scan (Figure 12d). These gating pulses are read out of the second storage tube 21' while the charged area 67 is being written. However, echo signals from the first hit are simultaneously being read out of the first storage tube 21 (due to its long storage characteristic) and applied to the gated circuit 19 along with the gating pulses. This means that the first hit is being permitted to activate the alarm 20.

To prevent this a disabling wedge-shaped area 70 (Figure 12d) is produced in the spiral reading scan 66 of the second storage tube 21'. The disabling wedge sweeps in synchronism with the writing beam wedge 68 of the spiral writing scan. At the time the writing beam wedge 68 lays down the charged area 67, no gating pulses are produced by the reading scan due to the fact that the reading scan is disabled over the charged area 67. As soon as the wedges 68 and 70 pass the charged area 67 due to the first hit, a second hit is recorded. Gating pulses now are produced by the remainder of the area of the spiral reading scan 66 of the second storage tube 21' throughout the period of the second antenna rotation and the second hit will activate the alarm 20.

Generation of the spiral scans is accomplished by the spiral scan deflection circuits 99 shown in block form in Figure 10. Since the circuits forming the spiral scan deflection system are well known per se, they are not illustrated in detail.

The output of the sine wave master oscillator 72 is impressed upon a sawtooth generator 74 in which the sine waves are employed to initiate the generation of sawtooth waves having a lower frequency than that of the sine waves. The outputs of the sine wave master oscillator 72 and the sawtooth generator 74 are then combined in a modulator (mixer) circuit 75. The resulting sawtooth-modulated sine wave is shifted 90° in phase by a phase shifter 76 and the shifted and unshifted sawtooth-modulated sine waves are applied to the orthogonal deflection coils 100 of the storage tube 21.

Enabling of a wedge-shaped sector 68 of the spiral scan is accomplished by applying a sine wave signal from the master oscillator 72 to the quadrature fields of a goniometer 78, the pickup coil of which is mechanically rotated in time synchronism with the antenna, but leading it in angular displacement by the angle $d\theta$. The output signal of the goniometer 78 is clipped and pulses are produced in a pulse generator 79. These pulses are employed to trigger an enabling generator 80 which produces rectangular enabling pulses.

The enabling pulses are then applied to the strobe enabler 71, a normally non-conducting amplifier, which is activated by the enabling pulses and, in turn, applies the enabling pulses to the control grid 23' of the second storage tube 21' so as to intensity-modulate its writing beam and provide the wedge shape of the writing spiral scan as shown in Figures 11c and 12c.

The enabling pulses are also applied to the cathode 29' of the second storage tube 21' thereby cutting off the reading beam during the time of their application and providing the disabling wedge 70 in the spiral reading scan 66 as shown in Figures 11d and 12d. A rough estimate of the target detection and false target detection probabilities obtainable with this invention is as follows:

If the signal-to-noise ratio, threshold level and gate size is such that the detection probability is (.5) and the false target probability is (.4), the detection probability reduces to (.45) while the false target probability reduces to the square of (.4) or (.16) when this invention is employed.

Assuming a higher signal-to-noise ratio such that the detection probability is (.8) and the false target probability is (.2), the detection probability reduces to (.7) and the false target probability is (.04).

What is claimed is:

1. In a system of the type in which repetitive signals are received in groups and in which the groups recur at a frame rate substantially lower than the signal repetition rate, a circuit for aiding in the separation of the repetitive signals from randomly occurring signals some of which may be larger in amplitude than some of the repetitive signals, comprising, in combination, a threshold circuit for eliminating all signals of less than a predetermined amplitude and for passing all remaining signals, said predetermined amplitude being such that at least some of said both types of signals pass through said threshold circuit; means for generating a gate pulse for each passed signal an interval of time after the occurrence of each passed signal substantially equal to the frame interval; and circuit means connected to receive said gate pulses and the signals passed by said threshold circuit for producing an output signal in response only to the coincidence of a gate pulse and a signal passed by said threshold circuit.

2. The combination with a system of the type in which periodically recurring impulses are received in groups and in which the groups recur at a frame rate substantially lower than the impulse repetition rate, of a circuit for aiding in the separation of the periodically recurring impulses from randomly occurring impulses some of lesser and some of greater amplitude than some of said periodically recurring impulses comprising, a threshold circuit for eliminating all impulses of less than a predetermined amplitude and for passing all remaining impulses, said predetermined amplitude being such that at least some of both types of impulses pass through said threshold circuit; means for generating at least one gate pulse for each passed impulse an interval of time after the occurrence of each passed impulse substantially equal to the period between succeeding groups of impulses; and circuit means connected to receive said gate pulses and said impulses passed by said threshold circuit for producing an output signal in response only to the coincidence of a gate pulse and an impulse passed by said threshold circuit.

3. In a system of the type in which repetitive signals are received in groups and in which the groups recur at a frame rate substantially lower than that of the signal repetition rate, a circuit for aiding in the separation of the repetitive signals from randomly occurring signals some of which may be larger in amplitude than some of the repetitive signals, comprising, in combination, a threshold circuit for eliminating all signals of less than a predetermined amplitude and for passing all remaining signals, said predetermined amplitude being such that at least some of said repetitive signals and some of the randomly occurring signals pass through said threshold circuit; storage tube circuit means including means producing a scanning reading beam and means producing a scanning writing beam for generating a gate pulse for each passed signal an interval of time after the occurrence of the passed signal substantially equal to the frame interval, said passed signals being applied to intensity modulate said writing beam, and said gate signals being derived from said reading beam; and circuit means connected to receive said gate pulses and said signals passed by said threshold circuit for producing an output signal in response only to the coincidence to the gate pulse and the signal passed by said threshold signal.

4. The invention as set forth in claim 3 in which said storage tube includes a target plate upon which the reading and writing beams impinge, and in which the writing beam is slightly defocused so as to produce a defocused image on said target plate of slightly larger size than if the beam were focused, and means coupled to said storage tube for maintaining said reading beam at a slight angle in advance of the writing beam during the scanning of said beams.

5. A circuit for separating repetitive impulses from random impulses, some of lesser and some of greater amplitude than said repetitive impulses comprising, in combination, a threshold circuit for eliminating all impulses of less than a predetermined amplitude and for passing all remaining impulses, said predetermined amplitude being such that at least some of said repetitive impulses are passed through said threshold circuit; means for generating at least one gate pulse for each passed impulse an interval of time after the occurrence of each passed impulse substantially equal to the period between succeeding repetitive impulses, said means comprising a first, a second and third storage tube, each including at least means for generating a writing beam, means for generating a reading beam, a target plate, and means for deflecting said beams; and gated circuit means connected to receive said gate pulses and said impulses passed by said threshold circuit for producing an output signal in response only to the coincidence of a gate pulse and an impulse passed by said threshold circuit.

6. A circuit in accordance with claim 5 including means for deflecting said writing beam of said first storage tube in plan-position-indicator fashion; means for deflecting said reading beam of said first storage tube, said writing beam of said second storage tube and said reading beam of said third storage tube in spiral scans and in synchronism, said writing beam of said second storage tube being slightly defocused to cause each passed impulse to be written as a roughly circular charged area; means for deflecting said reading beam of said second storage tube and said writing beam of said third storage tube in plan-position-indicator fashion and in synchronism with each other but leading said writing beam of said first storage tube in its rotational movement by a small angle $d\theta$, said writing beam of said third storage tube being slightly defocused in a manner corresponding to said defocusing of said writing beam of said second storage tube; means for deriving an output signal from the target plate of said first storage tube and applying said output signal to modulate said writing beam of said second storage tube; means for deriving an output signal from the target plate of said second storage tube and applying said output signal to modulate said writing beam of said third storage tube; and means for deriving gate pulses from the target plate of said third storage tube and applying said gate pulses to said gated circuit means.

7. A circuit in accordance with claim 6, wherein the frequency of said spiral scanning is a plurality of times greater than the frequency of said plan-position scanning, whereby at least one gate pulse derived from a given repetitive impulse during the course of said spiral scanning coincides in time with the succeeding recurrence of said repetitive impulse.

8. In combination, means for radiating periodically recurring pulses in a directional beam; means for periodically sweeping said beam through a volume of space, said sweep period being substantially longer than the pulse recurrence period; means including a threshold circuit for receiving echoes from targets illuminated by the swept beam and electrical noise signals; means coupled to said threshold circuit for generating a gate pulse for each signal passed by said threshold circuit an interval of time after the occurrence of said passed signal approximately equal to the sweep recurrence period; and circuit means connected to receive said gate pulses and said signals passed by said threshold circuit for producing an output signal in response only to the coincidence of a gate pulse and a signal passed by said threshold circuit.

9. In the combination as set forth in claim 8, said gate pulses being of slightly greater duration than the signals from which they are derived and the approximate center of said gate pulses occurring an interval of time after the occurrence of each passed signal equal to said sweep period.

10. In a radar system including means for radiating pulses in a directional beam, means for sweeping said beam to illuminate targets in a given area at recurring intervals, and means for receiving echo signals from said targets, apparatus for distinguishing said echo signals from electrical noise signals comprising, in combination, a threshold circuit connected to receive said echo signals and noise signals for eliminating all such signals having less than a predetermined amplitude and for passing all remaining signals, said predetermined amplitude being such that at least some of said echo signals pass through said threshold circuit; means coupled to said threshold circuit for generating a gate pulse for each signal passed by said threshold circuit an interval of time after the occurrence of said passed signal approximately equal to the interval of time which would be required for that signal to recur during the succeeding directional beam sweep if that signal were an echo signal derived from a fixed target, said means including a storage tube provided with means producing a writing beam and means producing a reading beam, said passed pulses being applied to modulate the intensity of said writing beam and said gate pulses being derived from said reading beam, and means coupled to said storage tube and to said means for sweeping said directional beam for sweeping said reading and writing beam in synchronism with the reading of said directional beam; and circuit means connected to receive said gate pulses and said signals passed by said threshold circuit for producing an output signal in response only to the coincidence of a gate pulse and a signal passed by said threshold circuit.

11. In a radar system as set forth in claim 10, said means for generating gate pulses including a storage tube provided with means producing a writing beam and means producing a reading beam, said passed pulses being applied to modulate the intensity of said writing beam and said gate pulses being derived from said reading beam, and means coupled to said storage tube and to said means for sweeping said directional beam for sweeping at least said writing beam in synchronism with said sweeping of said directional beam.

12. In a radar system as set forth in claim 11, said storage tube including a target plate and means for defocusing said writing beam, and said defocusing of said writing beam producing for each echo signal a charged area of sufficient size to prevent an echo signal received from a rapidly moving target from passing out of the charged area derived from the echo signal received from said target during the immediately preceding directional beam sweep cycle.

13. In a radar system as set forth in claim 12, means for sweeping said reading beam at an angle in advance of said writing beam.

14. In a radar system including means for radiating pulses in a directional beam, means for cyclically sweeping said beam to illuminate targets in a given area, and means for receiving echo signals from said targets, apparatus for distinguishing said echo signals from electrical noise signals comprising, in combination, a threshold circuit connected to receive said echo signals and noise signals for eliminating all such signals having less than a predetermined amplitude and for passing all remaining signals, said predetermined amplitude being such that at least some of said echo signals pass through said threshold circuit; means coupled to said threshold circuit for generating a gate pulse for each signal passed by said threshold circuit an interval of time after the occurrence of said passed signal approximately equal to the interval of time which would be required for that signal to recur in a beam sweeping cycle if that signal were an echo signal derived from a fixed target, said means including a storage tube provided with means producing a writing beam and means producing a reading beam, said passed pulses being applied to modulate the intensity of said writing beam and said gate pulses being derived from said reading beam, means for repeatedly deflecting said writing and reading beams radially outward from a rest position to form a series of writing and reading strobes, and means coupled to said storage tube and to said means for cyclically sweeping said directional beam for sweeping said reading and writing beams in synchronism with the sweeping of said directional beam; gated circuit means connected to receive said gate pulses and said signals passed by said threshold circuit for producing an output signal in response only to the coincidence of a gate pulse and a signal passed by said threshold circuit; and indicating means for producing an indication in response to said gated circuit output signal.

15. In a radar system as set forth in claim 14, said means for generating gate pulses including a storage tube provided with means producing a writing beam and means producing a reading beam, said passed pulses being applied to modulate the intensity of said writing beam and said gate pulses being derived from said reading beam, and means coupled to said storage tube and to said means for sweeping said directional beam for sweeping at least said writing strobe in synchronism with said sweeping of said directional beam.

16. In a radar system as set forth in claim 15, said storage tube including a target plate and means for defocusing said writing beam, said defocusing of said writing beam producing for each echo signal a charged area of sufficient size to prevent an echo signal received from a rapidly moving target from passing out of the charged area derived from the echo signal received from said target during the immediately preceding directional beam sweep cycle.

17. In a radar system as set forth in claim 16, means for sweeping said reading strobe at an angle in advance of said writing strobe.

18. Apparatus as set forth in claim 17, wherein said reading strobe is caused to precede with said writing strobe by an angle $d\theta$ by means of initially advancing the means for deflecting said reading beam by an angle $d\theta$ with respect to the means for deflecting said writing beam.

19. Apparatus as set forth in claim 18, including means for causing a slippage in the sweeping of said reading and writing strobes with respect to the sweeping of said directional beam, whereby said reading and writing strobes lag said directional beam by an additional angle $d\theta$ for every 360 degrees of directional beam sweep.

20. Apparatus as set forth in claim 19, wherein said means for causing slippage comprises differential gears coupled to said antenna and to the deflection means of said storage tube.

21. In a radar system including means for radiating pulses in a directional beam, means for cyclically sweeping said beam to illuminate targets in a given area; and means for receiving echo signals from said targets, apparatus for distinguishing said echo signals from electrical noise signals comprising, in combination, a threshold circuit connected to receive said echo signals and noise signals for eliminating all such signals having less than a predetermined amplitude and for passing all remaining signals, said predetermined amplitude being such that at least some of said echo signals are passed through said threshold circuit; means coupled to said threshold circuit for generating a gate pulse for each signal passed by said threshold circuit an interval of time after the occurrence of said passed signal approximately equal to the interval of time which would be required for that signal to recur in a beam sweeping cycle if that signal were an echo signal derived from a fixed target, said means for generating gate pulses including a storage tube provided at least with means producing a slightly defocused writing beam such that an impulse applied to intensify said writing beam produces a charged area of slightly greater size than the corresponding duration of said impulse, means producing a reading beam, means for deflecting said reading and writing beams radially outward from their rest positions to form respective strobe lines, and means for rotating said strobe lines in the same direction, to provide plan-position-type displays on said target plate, with said reading strobe line preceding said writing strobe line by an angle $d\theta$, where $d\theta$ is the angle between a strobe line passing through the center of a given charged area, said given charged area being located approximately half-way between the rest position of said writing beam and the fully deflected position of said writing beam and representing a singlehit on a radar target; circuit means connected to receive said gate pulses and said signals passed by said threshold circuit for producing an output signal in response only to the coincidence of a gate pulse and a signal passed by said threshold circuit; and indicating means for producing an indication in response to said circuit means output signal.

22. In a radar system including a rotating antenna and detection circuits for producing a combined output comprising periodically recurring target echo signals and random impulses, apparatus for automatically separating said target echo signals from said random impulses comprising, in combination: means coupled to said detection circuits for generating for each said target echo signal substantially at the time of its recurrence at least one gate pulse derived from a prior occurrence of said target echo signal, said means comprising a first, a second and a third storage tube, each including at least means for generating a writing beam, means for generating a reading beam, a target plate, and means for deflecting said beams; gated circuit means connected to receive said gate pulses and said echo pulses for producing an output signal in response only to the coincidence of a gate pulse and an echo pulse; and indicating means connected to said gated circuit means for producing an indication in response to said gated circuit means output signal.

23. Apparatus in accordance with claim 22, including means for deflecting said writing beam of said first storage tube in plan-position-indicator fashion; means for deflecting said reading beam of said first storage tube, said writing beam of said second storage tube and said reading beam of said third storage tube in spiral scans and in synchronism, said writing beam of said second storage tube being slightly defocused to cause each target echo to be written as a roughly circular charged area; means for deflecting said reading beam of said second storage tube and said writing beam of said third storage tube in plan-position-indicator fashion and in synchronism with each other but leading said writing beam of said first storage tube in its rotational movement by a small angle $d\theta$, said writing beam of said third storage tube being slightly defocused in a manner corresponding to said defocusing of said writing beam of said second storage tube; means for deriving an output signal from the target plate of said first storage tube and applying said output signal to modulate said writing beam of said second storage tube; means for deriving an output signal from the target plate of said second storage tube and applying said output signal to modulate said writing beam of said third storage tube; and means for deriving gate pulses from the target plate of said third storage tube and applying said gate pulses to said gated circuit means.

24. Apparatus in accordance with claim 23, including a threshold circuit coupled to said target plate of said first storage tube for eliminating all target echo signals and random impulses of less than a predetermined amplitude and for applying those above said predetermined amplitude to modulate said writing beam of said second storage tube.

25. Apparatus in accordance with claim 24, wherein the frequency of said spiral scans is greater than the frequency of said plan-position-indicator scans, whereby at least one gate pulse derived from a given echo signal occurs in the plan-position scanning cycle at the time when the next succeeding echo signal occurs.

References Cited in the file of this patent

UNITED STATES PATENTS

| | | |
|---|---|---|
| 2,361,437 | Trevor | Oct. 31, 1944 |
| 2,412,974 | Deloraine | Dec. 24, 1946 |
| 2,430,038 | Wertz | Nov. 4, 1947 |
| 2,487,995 | Tucker | Nov. 15, 1949 |